United States Patent [19]
Jaskowiak et al.

[11] Patent Number: 5,465,138
[45] Date of Patent: Nov. 7, 1995

[54] DEVELOPMENT APPARATUS HAVING A SPINCAST ROLL ASSEMBLY

[75] Inventors: Timothy R. Jaskowiak, Webster; Daniel L. Coughlin, Elba; Julie A. Perez, Pittsford; Daniel R. Gilmore, III, Fairport; Thomas L. DiGravio; Kevin H. Taft, both of Ontario, all of N.Y.

[73] Assignee: Xerox Corporation, Stamford, Conn.

[21] Appl. No.: 297,477

[22] Filed: Aug. 29, 1994

[51] Int. Cl.$^6$ .................................................. G03G 15/08
[52] U.S. Cl. ............... 355/245; 29/895.22; 29/895.32; 264/311; 492/47; 492/59
[58] Field of Search .................................. 355/200, 245, 355/259; 118/651; 29/895.22, 895.32; 492/47, 59; 264/311

[56] References Cited

U.S. PATENT DOCUMENTS

| | | | |
|---|---|---|---|
| 3,823,688 | 7/1974 | Klett | 118/637 |
| 4,034,709 | 7/1977 | Fraser et al. | 118/658 |
| 4,057,666 | 11/1977 | Drummond, Jr. | 428/35 |
| 4,267,797 | 5/1981 | Huggins | 118/658 |
| 5,177,538 | 1/1993 | Mammino et al. | 355/259 |
| 5,229,813 | 7/1993 | Cherian | 355/200 |
| 5,245,392 | 9/1993 | Behe et al. | 355/259 |

OTHER PUBLICATIONS

Robert D. Bonham, "Snap Together Magnet Core Assembly", *Xerox Disclosure Journal*, vol. 5, No. 3, May/Jun. 1980, p. 313.
Robert D. Bonham, "Neck Down Flow Form Mag Brush Roll & Core", *Xerox Disclosure Journal*, vol. 6, No. 1, Jan./Feb. 1981, p. 25.

*Primary Examiner*—Joan H. Pendegrass

[57] ABSTRACT

A development apparatus includes a housing defining a chamber holding a supply of two-component developer material including toner, and magnetizable carrier beads. The development apparatus also includes an increased reliability roller assembly within the housing for repeatably transporting a desired quantity of attracted developer material through a development zone. The roller assembly includes a first and a second preformed end cap sections each having a stub shaft portion and a cylindrical capping portion connected to the stub shaft portion and having an outer surface and assembly recesses formed into the outer surface. The roller assembly also includes a sleeve section connecting the first and the second preformed end cap sections, the sleeve section being spincast as a layer over each of the cylindrical capping portions, and into the assembly recesses of the end cap sections, so as to precisely and reliably assemble each capping portion, to the sleeve section.

16 Claims, 6 Drawing Sheets

DEVELOPMENT APPARATUS HAVING A SPINCAST ROLL ASSEMBLY

This invention relates generally to electrostatographic reproduction machines, and more particularly concerns a development apparatus having a spincast roll assembly.

Generally, the process of electrostatographic reproduction includes uniformly charging a photoconductive member, or photoreceptor, to a substantially uniform potential, and imagewise discharging it or imagewise exposing it to light reflected from an original image being reproduced. The result is an electrostatically formed latent image on the photoconductive member. The latent image so formed is developed by a development apparatus bringing a charged dry or liquid developer material into contact therewith. Two-component and single-component developer materials are commonly used. A typical two-component dry developer material comprises magnetic carrier particles, also known as "carrier beads," having charged toner particles adhering triboelectrically thereto. A single component dry developer material typically comprises charged toner particles only. In either case, the charged toner particles when brought into contact with the latent image, are attracted to such latent image, thus forming a toner image on the photoconductive member. The toner image is subsequently transferred to a receiver member, such as a copy sheet, which is then passed through a fuser apparatus where the toner image is heated and permanently fused to the sheet thus forming a copy of the original image.

As described above, to develop a latent image in an electrostatographic reproduction machine, charged toner particles are brought, by a development apparatus, into contact with the latent image formed. For such development using two-component dry developer material, the development apparatus typically includes a housing defining a chamber within which the developer material is mixed and charged. Moving and mixing two-component dry developer material triboelectrically and oppositely charges the "carrier beads" and the toner particles causing the toner particles to adhere to the carrier beads.

As disclosed for example in U.S. Pat. No. 4,267,797, one type of a two-component development apparatus includes a housing defining a chamber for holding two-component dry developer material that includes toner and magnetizable carrier particles or beads. The development apparatus also includes at least a rotatable magnetic roll for transporting a quantity of such developer material in the form of a magnetic brush into and through a development zone of the apparatus for contacting a latent image to be developed.

As also disclosed for example in U.S. Pat. No. 5,245,392, and U.S. Ser. No. 07/091858, both assigned to the assignee of the present application, another type of a two-component development apparatus includes a housing defining a mixing chamber storing dry developer material consisting of carrier beads and charged toner particles. The development apparatus also includes a donor roll mounted within the housing for rotatably transporting charged toner particles from the mixing chamber to a development zone. A plurality of electrode wires are mounted closely spaced relative to the donor roll within the development zone. An AC voltage is applied to the electrode wires for forming a toner cloud in the development zone. Electrostatic fields generated by an adjacent latent image serve to attract charged toner particles from the toner cloud, thus developing the latent image. In addition, a conductive, usually metallic magnetic roll is also mounted within the housing for transporting developer material from the mixing chamber to the donor roll. The magnetic roll is mounted rotatably between the mixing chamber and the donor roll, and serves to magnetically attract and hold magnetizable carrier particles or beads (which have charged toner triboelectrically adhering thereto) onto its toughened or knurled surface. The charged toner is then electrostatically attracted from the carrier beads on the roughened or knurled surface of the magnetic roll onto the donor roll for transporting to the development zone.

Typically, the magnetic rolls and donor rolls of each such development apparatus include end cap sections for closing the ends of each roll, and for mounting each such roll to the housing of the development apparatus. For example, U.S. Pat. No. 3,823,688, issued Jul. 16, 1974, to Klett discloses a roller assembly for use in a magnetic brush assembly. The roller assembly includes end caps and a floating bias on a shaft of the roller assembly.

U.S. Pat. No. 4,034,709, issued Jul. 12, 1977, to Fraser et al. discloses a developer roll having a styrene-butadiene layer, and end caps for closing the ends of the developer roll.

U.S. Pat. No. 4,057,666, issued Nov. 8, 1977, to Drummond, Jr., discloses a magnetic brush developer roll having shrunk fitted end sleeves.

Xerox Disclosure Journal, Vol. 5, Number 3, May/June 1980, p. 313 discloses a snap together magnetic core assembly roller. The roller includes injection molded magnet sleeves and molded end caps having end slots for removably receiving the magnet sleeves.

Xerox Disclosure Journal, Vol. 6, Number 1, Jan./Feb. 1981, p. 25 discloses a magnetic brush roller formed by flowing its material into an integral roll and roll shaft.

In a development apparatus including a magnetic roll and a donor roll assemblies, the uniformity and quality of latent images developed in the development zone depend significantly on the uniformity of developer material repeatably transported, for example, by the magnetic roll for delivery to such donor roll, and on the uniformity of toner particles transported by such donor roll through the development zone. More importantly, the uniformity and quality of images developed in general also depends significantly on precise spacing of the magnetic roll assembly of the donor roll from latent images on an image bearing surface. Such spacing, as well as, the uniformity of a trimmed layer of toner or developer material on the surface of such a roll, can, of course, be affected dentrimentally by a surface "runout" of such a roll, or by vibrations of such a roll during rotation. Misalignment of either of the two end caps of such a roll with its sleeve section, and any out-of-roundness of the sleeve section, are understandably factors that would contribute to such runout and vibrations. Looseness or warpage of poorly assembled end caps, such press fitted or screw mounted end caps from extended usage are also likely to contribute to such runout and vibrations. There is therefore a need for a relatively inexpensive method of forming and assembling sleeve and end cap sections of developer roll assembly that overcomes the above disadvantages.

SUMMARY OF THE INVENTION

In accordance with an aspect of the present invention, there is provided a rotatable roller assembly for mounting within the housing of a development apparatus to move developer material. The rotatable roller assembly includes first and second preformed end cap sections each including an outer surface defining an outer diameter, and assembly recesses formed into the outer surface thereof for assembling each end cap section. The roller assembly also includes a spincast sleeve section spincast over, and connecting, the first and second end cap sections. The spincast sleeve section includes, an outer layer having an outer diameter greater than the outer diameter of each end cap section, and portions thereof projecting into the assembly recesses of each end cap section for integrally and reliably assembling and locking each end cap section to the sleeve section.

In accordance with another aspect of the present invention, there is provided a method of forming a roller assembly for use in a development apparatus of an electrostatographic reproduction machine. The method includes the step of staging in a spincasting mold assembly, preformed first and second end cap sections each having a stub shaft portion, and a cylindrical capping portion including an outer surface and a plurality of assembly and anti-rotation recesses formed into the outer surface. The method also includes the step of adding and spincasting in the spincasting mold assembly a first molten material for forming an outer layer of a sleeve section of the roller assembly interconnecting the first and second end cap sections, and for forming projecting portions thereof into the plurality of assembly and anti-rotation recesses of the cylindrical capping portion.

BRIEF DESCRIPTION OF THE DRAWINGS

Other features of the present invention will become apparent as the following description precedes and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Inasmuch as the art of electrostatographic reproduction is well known, the various processing stations employed in an exemplary electrostatographic reproduction machine will be shown hereinafter schematically, and their operations described only briefly.

Figure 6:
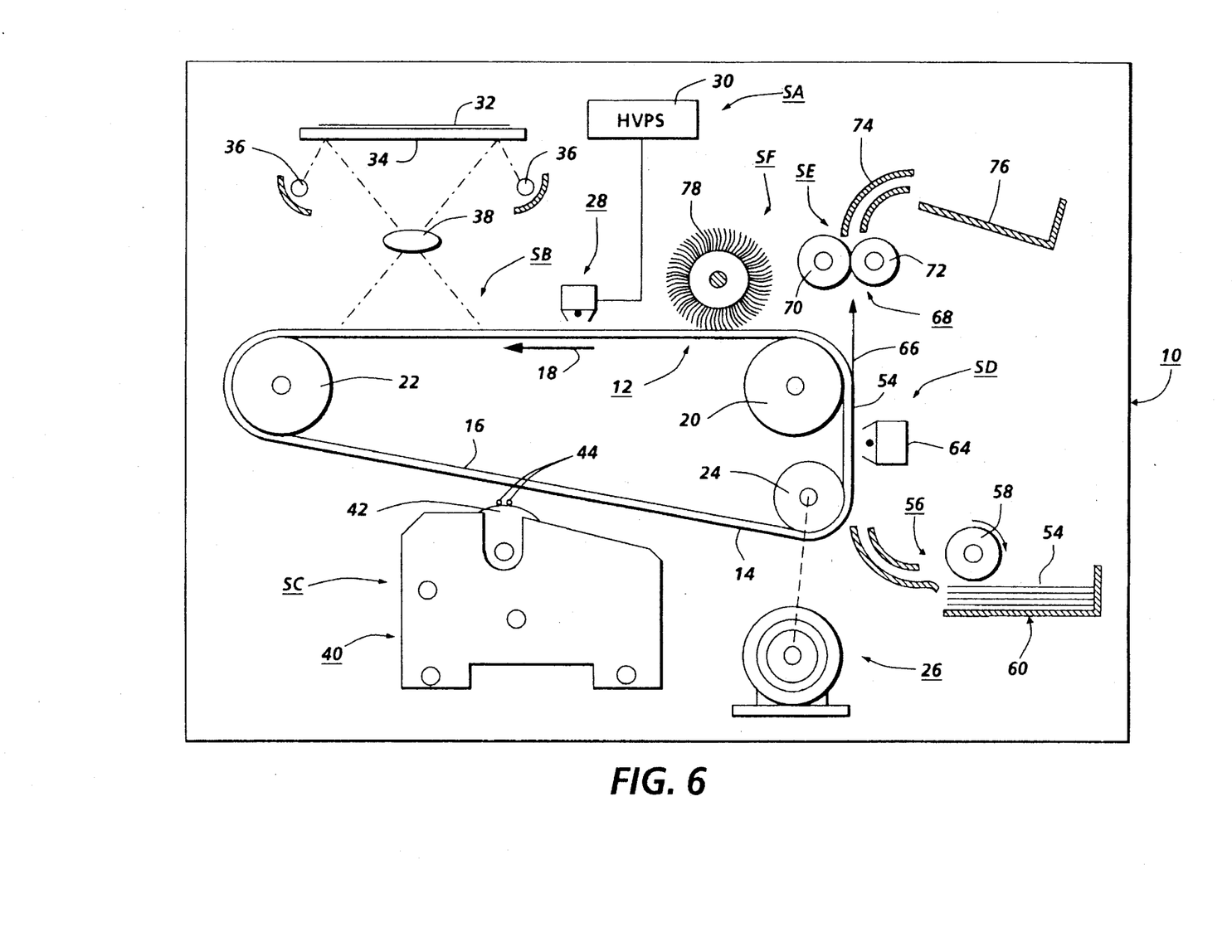
FIG. 6 is a schematic elevational view of an illustrative electrostatographic reproduction machine incorporating a development apparatus of the present invention.

Referring initially to FIG. 6, there is shown an exemplary electrostatographic reproduction machine 10 incorporating the development apparatus of the present invention. The electrostatographic reproduction machine 10 for example employs a belt type image bearing member 12 having a photoconductive surface 14 formed over an electrically grounded conductive substrate 16. One skilled in the art, however, will appreciate that another suitable arrangement of a photoconductive image bearing member may be used. As shown, belt 12 moves in the direction of arrow 18 to advance successive portions of photoconductive surface 14 sequentially through the various processing stations disposed about the path of movement thereof. Belt 12 is entrained about stripping roller 20, tensioning roller 22, and drive roller 24. Drive roller 24 is mounted rotatably in engagement with belt 12. Motor 26 is coupled to, and rotates roller 24 in order to advance belt 12 in the direction of arrow 18. Belt 12 is maintained in tension by a suitable pair of springs (not shown) resiliently urging tensioning roller 22 against belt 12 with a desired spring force. Stripping finger 20 and tensioning roller 22 are mounted to rotate freely.

Initially, a portion of belt 12 passes through charging station SA where a corona generating device, indicated generally by the reference numeral 28, charges photoconductive surface 14 to a relatively high, and substantially uniform potential. High voltage power supply 30 is coupled to corona generating device 28, and excitation of the power supply 30 causes corona generating device 28 to charge a portion of the photoconductive surface 14 of belt 12. After such charging, the charged portion is advanced, as belt 12 is moved, to exposure station SB.

At exposure station SB, lamps 36 flash light rays for reflection onto an original document 32 that is placed face down upon a transparent platen 34. The light rays reflected imagewise from the original image of document 32 are transmitted through lens 38 to form a light image thereof. Lens 38 focuses the imagewise light rays onto the charged portion of photoconductive surface 14 at exposure station SB and thus selectively dissipates the charge thereon to form a latent image. The latent image thus formed on photoconductive surface 14 corresponds to the informational areas contained within the original image of document 32. For such image wise exposure of photoconductive surface 14, a raster output scanner (ROS) (not shown) may alternatively be used in lieu of the lamps and light lens system previously described. As is well known, the ROS can be used as such to layout an image in a series of horizontal scan lines with each line having a specified number of pixels per inch.

After the electrostatic latent image has been formed thus on photoconductive surface 14, belt 12 advances the latent image to development station SC. At development station SC, the development apparatus of the present invention, indicated generally by the reference numeral 40, (to be described in detail below) develops the latent image recorded on the photoconductive surface 14 to form a toner image. Belt 12 then advances the toner image to transfer station SD where a copy sheet 54 is advanced by sheet feeding apparatus 56 into a transfer relation with the toner image. Preferably, sheet feeding apparatus 56 includes a feed roll 58 contacting the uppermost sheet of a stack 60 of such sheets. Transfer station SD also includes a corona generating device 64 which sprays ions onto the back side of sheet 54 to attract the toner image from photoconductive surface 14 onto sheet 54. After such image transfer, sheet 54 is separated from the belt 12 and moved in the direction of arrow 66 onto a conveyor (not shown) which advances sheet 54 to fusing station SE.

As shown, fusing station SE includes a fuser assembly indicated generally by the reference numeral 68 that has a pair of fusing rolls. The fusing assembly rolls 68 preferably include a heated fuser roller 70 and a back-up pressure roller 72. Sheet 54 is passed between fuser roller 70 and back-up roller 72 so that the toner image thereon contacts heated fuser roller 70. In this manner, the toner image is heated, fused and permanently affixed to sheet 54 forming a sheet copy of the original image of document 32. The sheet copy now on sheet 54 is then advanced through a chute 74 to a catch tray 76 for subsequent removal from the reproduction machine 10.

Meanwhile, belt 12 next moves the portion of the surface 14 from which the image had been transferred to the copy sheet 54 to a cleaning station SF where residual toner particles are cleaned or removed. Cleaning station SF, for example, includes a rotatably mounted fibrous brush 78 that rotates in contact with photoconductive surface 14 for cleaning by removing the residual toner particles. Subsequent to such cleaning, a discharge lamp (not shown) floods photoconductive surface 14 with light in order to dissipate any residual electrostatic charge remaining thereon from the prior imaging cycle.

It is believed that the foregoing description is sufficient for purposes of the present application to illustrate the general operation of an electrostatographic reproduction machine incorporating the development apparatus of the present invention. Typically, the speed of such electrostatographic reproduction machines is measured in terms of a number of sheet copies produced per unit time. Among different families of such machines, speed therefore varies significantly from a low between 10 and 20 copies per minute to a high of greater than 100 copies per minute. For such machines to produce high quality copies or reproductions of original images, the processing stations (including the development station SC), must be designed so as to function effectively at a desired speed of the machine. For example, the development station SC therefore must be capable of functioning as such, even at substantially high machine speeds, to repeatably deliver a uniform, desired quantity of toner particles to the development zone for latent image development.

Figure 1A:
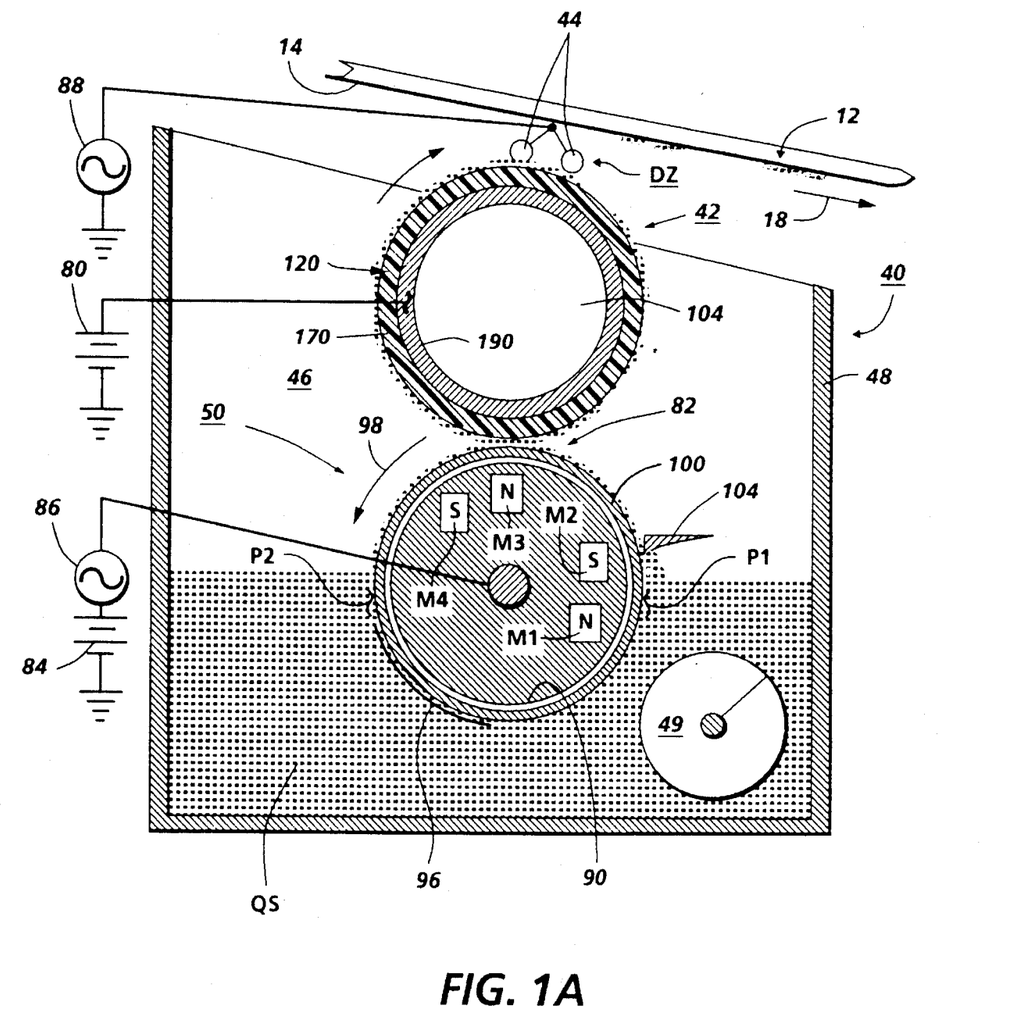
FIG. 1A is a simplified elevational view of one embodiment of a development apparatus according to the present invention.

Referring now to FIG. 1A, there is shown one embodiment of the development apparatus 40 of the present invention. The development apparatus 40 includes improved elements that enable an extended life, and the repeatable delivery of a uniform, desired quantity of toner for high speed latent image development. As shown, development apparatus 40 includes the roller assembly of the present invention shown generally as 42. The roller assembly 42 is a donor roll mounted, at least partially, within a mixing chamber 46. Mixing chamber 46 is defined by housing 48, and holds a supply QS of dry developer material consisting of toner particles and carrier beads. The roller assembly 42 is rotatable precisely to transport toner particles (fed thereto from the chamber 46) into contact with cloud producing electrode wires 44 within a development zone DZ for latent image development. The developer material QS typically is a two-component dry developer material comprising at least magnetizable carrier beads and the toner particles. As is well known, the developer material is moved and mixed within the mixing chamber 46 by a mixing device 49 in order to oppositely and triboelectrically charge such carrier beads and toner particles respectively. As a consequence of such charging, the oppositely charged toner particles adhere triboelectrically to the charged magnetizable carrier beads. The development apparatus 40 also includes a developer material feeder assembly or magnetic roll 50 disposed interiorly of the chamber 46 for feeding a quantity QF of developer material from the chamber 46 to the donor roll 42. The magnetic roller 50 and the donor roll 42 are electrically biased relative to each other so that charged toner particles within the quantity QF of developer material fed to the donor roll 42 are attracted from the magnetic roll 50 to such donor roll 42.

As further shown in FIG. 1A, the donor roll 42 is biased to a specific voltage, by a DC power supply 80 in order to enable the donor roll 42 to attract charged toner particles off of magnetic roll 50 in a nip 82. To enhance the attraction of charged toner particles from the chamber 46, magnetic roll 50 is biased by a DC voltage source 84, and by an AC voltage source 86 that functions to temporarily loosen the charged toner particles thereon from their adhesive and triboelectric bonds to the charged, magnetized carrier beads. Loosened as such, the toner particles can be attracted more easily to the donor roll 42. AC voltage source 86 can be applied either to a conductive layer of the magnetic roll 50 as shown in FIG. 1, or directly to the donor roll in series with the DC supply 80. Similarly as shown, an AC bias is applied to the electrode wires 44 by an AC voltage source 88 and serves to loosen charged toner particles from the donor roll 42, as well as to form a toner cloud within the development zone DZ.

Figure 1B:
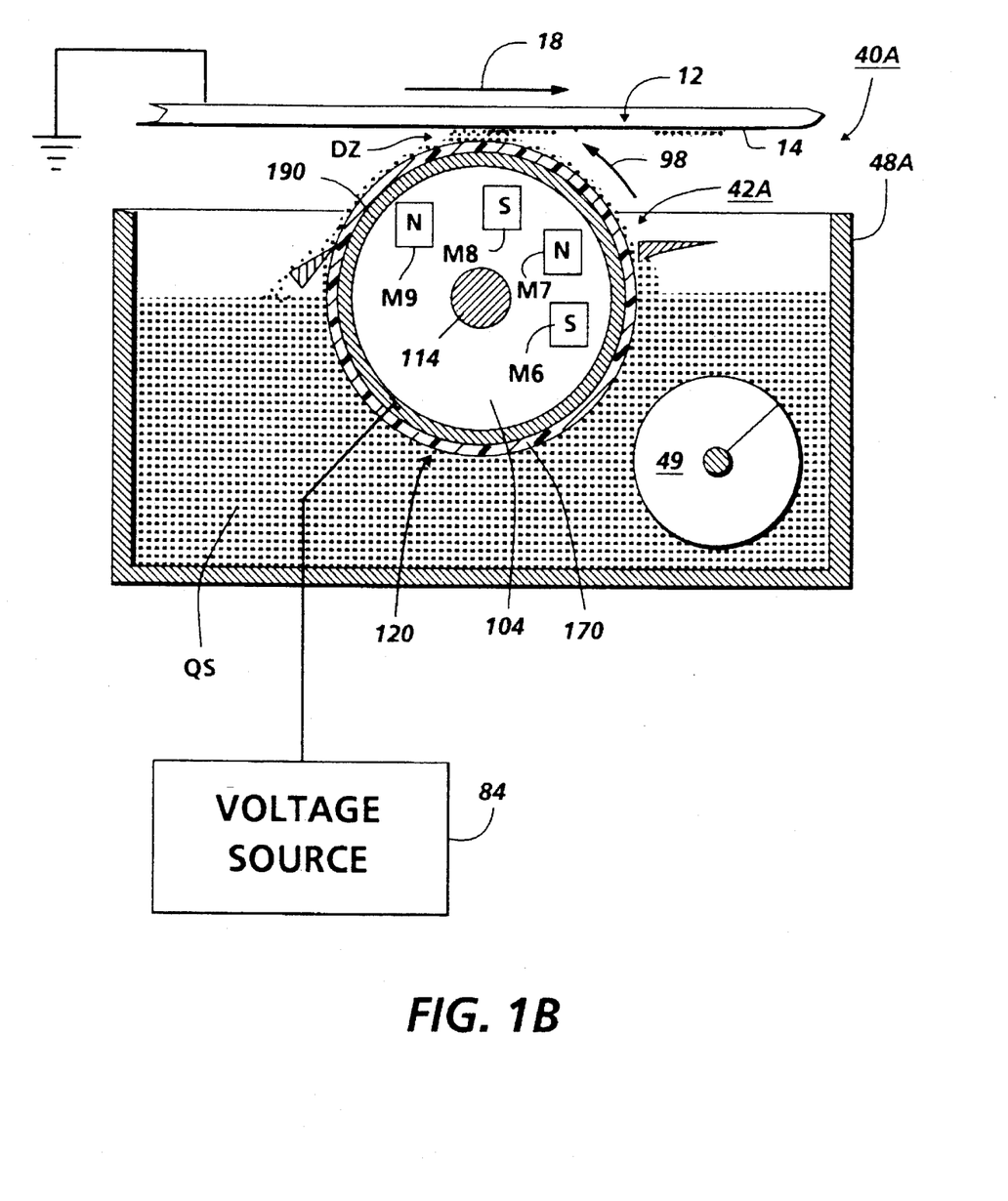
FIG. 1B is a simplified elevational view of a second embodiment of a development apparatus according to the present invention.

Referring now to FIG. 1B, there is shown another embodiment 40A of the development apparatus of the present invention. In this embodiment, like elements as in FIG. 1A are shown with like reference numerals. Importantly, the development apparatus 40A also includes the improved elements that enable an extended life, as well as the repeatable delivery of a uniform, desired quantity of toner for high speed latent image development. In FIG. 1B, the roller assembly of the present invention is shown generally as 42A, and is being used effectively, in a magnetic brush development apparatus housing 48A, as a magnetic brush developer roll. As is well known, the magnetic brush developer roll 42A as such receives developer material from the mixing chamber 46 and transports it directly into and through the development zone DZ for image development.

As illustrated in FIGS. 1A and 1B, the roller assembly of the present invention 42, 42A as used in a development apparatus 40, 40A, respectively, is mounted rotatably, spaced in the development zone DZ from the latent image to be development, and is rotatable for transporting developer material into the development zone DZ. As discussed above, the uniformity and quality of images developed thereby depend significantly in part on the preciseness of the spacing, as well as, on the uniformity of quantities of developed material transported thereby per rotation, for example, into the development zone. Surface "runout" problems with the sleeve section of the roller assembly, for example, will detrimentally affect the desired spacing. Additionally, poorly assembled or misaligned end cap sections also are likely to introduce vibrations during rotation, and thus also detrimentally affect spacing precision as well as developer material uniformity on such a roller assembly.

Figure 2A:
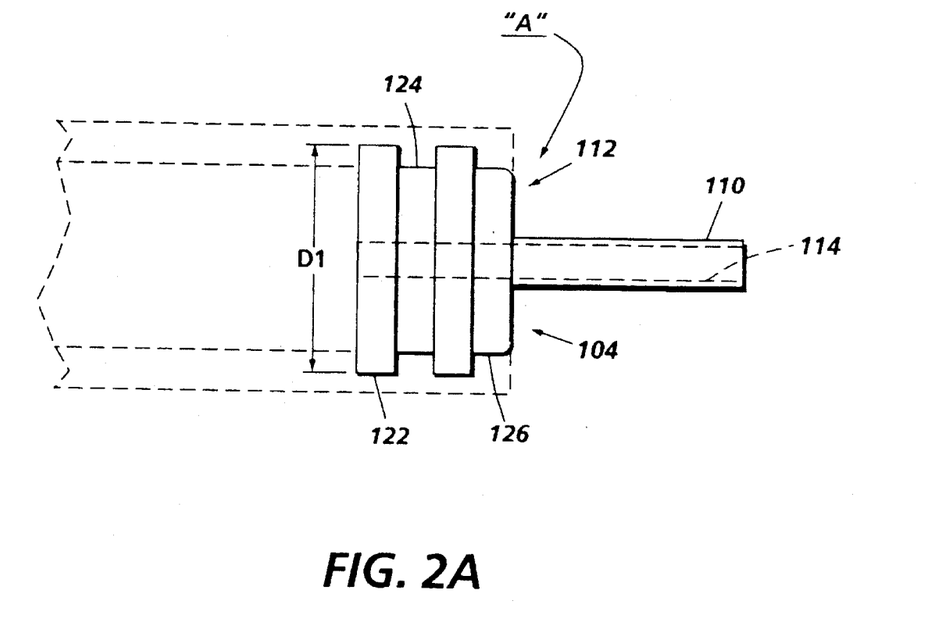
FIG. 2A is a side view of one embodiment of an end cap of the roller assembly of the present invention.
Figure 2B:
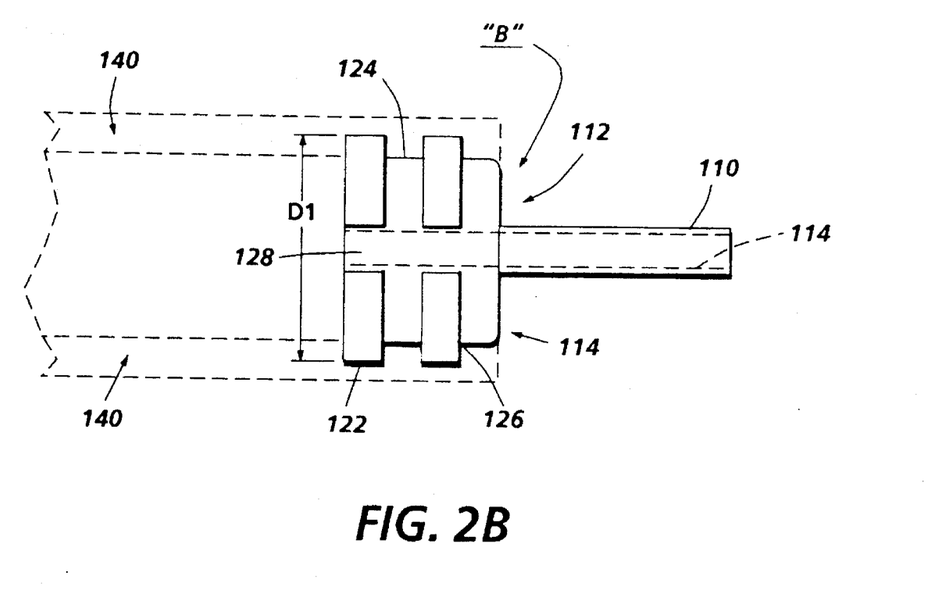
FIG. 2B is a side view of another embodiment of an end cap of the roller assembly of the present invention.

Referring now to FIGS. 2A and 2B, a first type embodiment "A" and a second type embodiment "B" of preformed end cap sections 104 of the roller assembly 42, 42A of the present invention, are illustrated. As shown, each type of end cap section includes a stub shaft portion 110 for mounting the roller assembly 42, 42A to the housing 48 of development apparatus 40, 40A, and a generally cylindrical capping portion 112 that is connected at one end to the stub shaft portion 110. The stub shaft portion of each type of end cap section 104 preferably is also suitable for driving or rotating the roller assembly 42, 42A. The end cap section 104 may include a center bore 114 (shown in dotted lines) through the stub shaft and cylindrical capping portions, for inserting components into the core or center of the roller assembly. For example, as shown in FIG. 1B, core components such as magnetic bars M6, M7, M8 and M9 may be inserted through the bore 114 prior to spincasting a sleeve section 120 over the end cap section 104, or after such spincasting. The cylindrical capping portion 112 has an outer surface 122 that is generally cylindrical and that defines an out end diameter D1 thereto. The outer surface 122 includes at least a pair of axially spaced, circumferentially extending assembly recesses 124, 126 formed into the outer surface 122, for assembling and locking each end cap section 104 to the sleeve section 120 of the roller assembly 42, 42A.

Figure 5A:
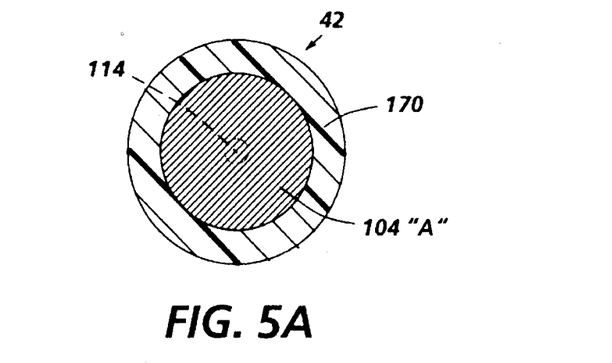
FIG. 5A is an end section of the roller assembly of FIG. 4 taken along view plane E'—E', when the end cap used is that of FIG. 2A.
Figure 5B:
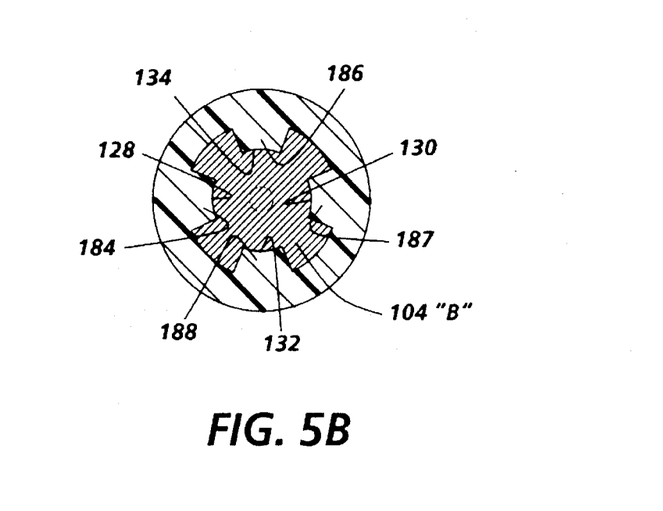
FIG. 5B is an end section of the roller assembly of FIG. 4 taken along view plane E—E when the end cap used is that of FIG. 2B.

As further shown, the cylindrical capping portion 112 of each end cap section 104 of the FIG. 2B embodiment type additionally includes at least a pair of axially extending anti-rotation recesses 128, 130 (FIG. 5B) that are formed into the outersurface 122. The pair of anti-rotation recesses 128, 130 as shown, are formed spaced substantially 180 degrees about the circumference of the cylindrical capping portion 112. As illustrated in FIG. 5B, this embodiment of the end cap section preferably includes four (4) such anti-rotation recesses 128, 130 and 132, 134, that are formed into the outersurface 122, and thus are spaced substantially 90 degrees from each other about the circumference of the cylindrical capping portion 112 thereof.

Although the assembly and anti-rotation recesses 124, 126, and 128, 130, 132,132, respectively, are shown extending circumferentially and axially, it is understood that other patterns of recesses, for example, criss-crossing diamond knurl type recesses, can work equally as well.

Figure 3:
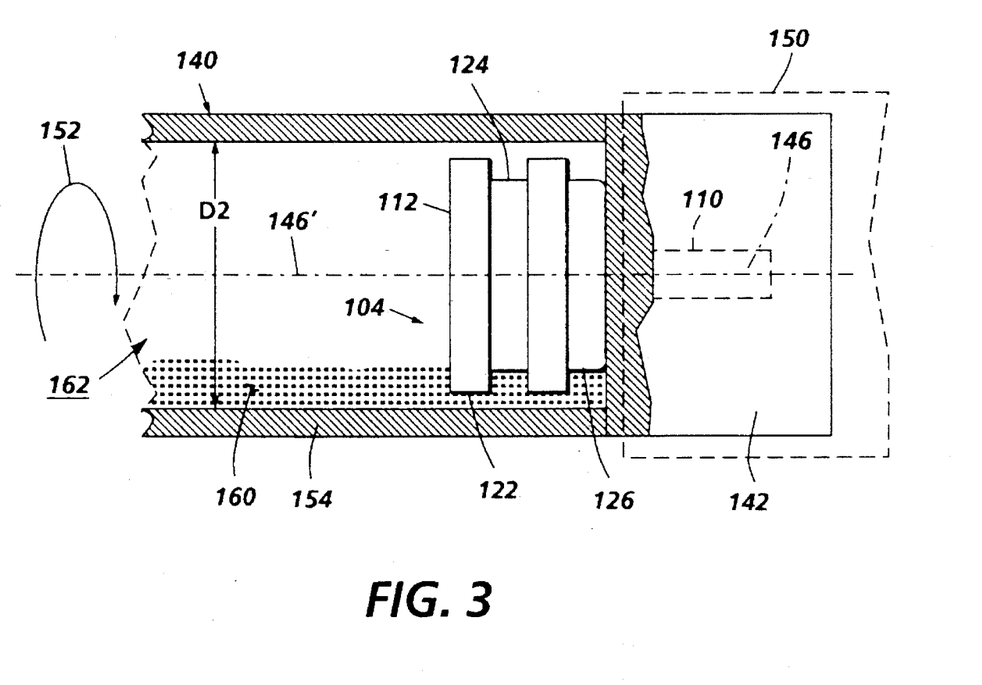
FIG. 3 is a side view, partly in section, of the end cap of FIG. 2A staged in a mold with molten, roller sleeve material about to be spincast.

Referring now to FIG. 3, the method of forming the roller assembly 42, 42A of the present invention, is illustrated, in part. As shown, the method includes the step of staging in a spincasting mold assembly 140, a pair of end cap sections 104, preferably of the same embodiment type "A" or "B" of FIG. 2A or 2B, respectively. In FIG. 3, only one end cap section 104 is shown, since description of the method as to the one end cap section shown, is equally applicable to the other end cap section 104 of the pair. The mold assembly 140 includes a base portion 142 with suitable means for staging and firmly retaining each end cap section 104 such that the axis 146 of each end cap section and that 146' of the mold assembly are coincident. The base portion 142 of the mold assembly is mountable to a drive means 150 for rotating the mold assembly 140, as well as, the contents thereof about the axis 146, 146' as shown by the arrow 152.

The mold assembly 140 also includes a hollow cylindrical body portion 154 having an internal diameter D2 that is greater than the external or outer diameter D1 of the cylindrical capping portion 112 of each end cap section 104. The method of the present invention further includes the steps of adding to the mold assembly, through a suitable material receiving aperture (not shown), a specific volume of a molten, first material 160, such as a thermoset plastic material, for example vinyl ester resin or epoxy resin, into the hollow or cavity 162 of the mold assembly. Preferably, carbon powder is added to the selected resin in order to make the formed layer electronically conductive. The specific volume of the molten, first material 160 is controlled to produce a desired thickness for the wall of the sleeve section 120 of the roller assembly. Where the roller assembly, e.g. 142A, includes inserted core components, it is desirable that the wall be thick enough to contact and thus hold or retain such core components therein. Then, with the material receiving aperture secured, the method next includes the step of spinning the mold assembly 140 using drive means 150 so as to spincast and cure the molten, first material 160 into an outer layer 170 (FIGS. 1A, 1B and 4) of the sleeve section 120 that connects the two end cap sections 104 of the roller assembly 42, for example. During such rotation and spincasting, centrifugal forces cause the molten material resin 160 to move outwardly of the axis 146' of the spinning mold assembly, to form the outer layer 170 against the internal diameter D2 wall of the mold assembly. Importantly, the molten material 160 during the spinning, also moves or flows into and cures as projecting portions 180, 182 into the assembly recesses 124, 126 of the end cap section 104, as well as projecting portions 184, 186, 187, 188 (FIG. 5B) into the anti-rotation recesses 128, 130, 132 and 134 (in the case of type "B" end cap sections).

According to the present invention, it is also preferable as shown, to have a second inner layer 190 of the sleeve section 120. As such, a second molten material such as a thermoset plastic material, for example vinyl ester, that is fiber filled or that includes glass beads in order to form a hard, wear resistant inner layer, is added into the interior of the first, outer layer 170. The mold assembly 140 is then also rotated, spincasting the second layer 190 against the interior of the first layer 170.

Figure 4:
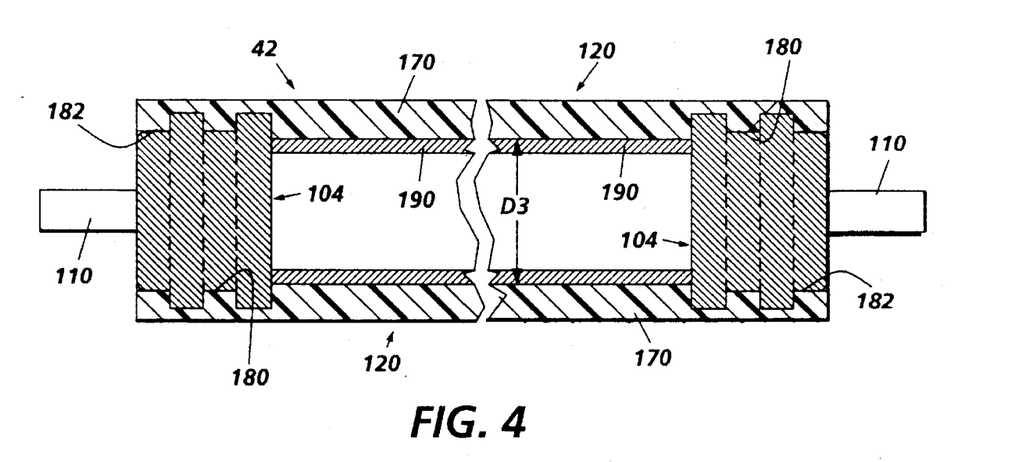
FIG. 4 is a side view of the spincast roller assembly of the present invention.

Referring now to FIG. 4, a completely formed roller assembly 42, 42A of the present invention is shown including preformed end cap sections 104 of the type shown in FIG. 2A. As illustrated, the roller assembly 42, 42A includes a first and a second preformed end cap sections 104, 104 respectively. Each preformed end cap section 104 includes a stub shaft portion 110 for driving the roller assembly, and for mounting to the housing 48 of development apparatus 40, 40A. Each end cap section 104 also includes a cylindrical capping portion 112 for capping the ends of the roller assembly. Each cylindrical capping portion is connected at one end to the stub shaft portion 110 thereof, and has an outersurface 122 and at least a pair of assembly recesses 124, 126 formed into the outersurface.

The roller assembly 42, 42A also includes a sleeve section 120 connecting the preformed first and second end cap sections 104, 104. Sleeve section 120 includes a first outer layer 170 that according to the present invention is useful for transporting developer material. In order to minimize the problems of "runout" and misalignment of rotational axes, the sleeve section 120 is formed by spincasting over the preformed end cap sections 104. As such, the first outer layer 170 is spincast so that it has an internal diameter D3 which is less than the maximum outer diameter D1 of the cylindrical capping portion 112 of each end cap section 104. The mold assembly 140 used, and the specific volume of material 160 used for forming the first outer layer 170 are such that the outer diameter D2 of the first outer layer 170 is greater than the maximum outer diameter D1 of each cylindrical capping portion 112. Accordingly, as shown in FIGS. 5A and 5B, the material of the first, outer layer 170 when spincast and cured, forms retaining projections 180, 182 into the assembly recesses and 124, 126 and projections 184, 186, 187 and 188 into the anti-rotation recesses 128, 130, 132 and 134 of the capping portions of the end cap sections used.

A second layer 190, for example, a glass bead filled resin layer, is also spincast within or inside the first outer layer 170. As is known, spincasting of such a second layer 190 can be carried out as an individual step subsequent to the spincasting of the first layer 170, or simultaneously. For simultaneous spincasting, the specific gravity of the material of the first layer 170 should be greater than the specific gravity of the material of the second inner layer 190.

As can be seen, a development apparatus 40 has been disclosed including a roller assembly 42 that is formed by spincasting sleeve section layers 170, 190 against precisely aligned, preformed end cap sections 110 including assembly recesses and anti-rotation recesses. The first outer layer 170 is spincast to form retaining portions 180, 182 projecting into the assembly and anti-rotation recesses, such that during rotation the roller assembly will be locked and not experience any detrimental vibration effects. The method of forming the roller assembly reduces costs and substantially reduces the likelihood of end cap and sleeve section axial misalignment, as well as relative surface run out.

We claim:

1. A roller assembly for use in a development apparatus of an electrostatographic reproduction machine, the roller assembly comprising:
   (a) a first and a second preformed end cap sections each including a cylindrical capping portion having an outer surface and assembly recesses formed into said outer surface; and
   (b) a sleeve section connecting said first and said second preformed end cap sections, said sleeve section being spincast as a layer over each said cylindrical capping portion, and into said assembly recesses of said first and said second end cap sections to precisely and reliably assemble and lock each said capping portion to said sleeve section.

2. A roller assembly for use in a development apparatus of an electrostatographic reproduction machine, the roller assembly comprising:
   (a) a first and a second preformed end cap sections each including a cylindrical capping portion having an outer surface and an assembly recess formed into said outer surface; and
   (b) a sleeve section spincast over and connecting said preformed said first and said second end cap sections, said spincast sleeve section including (i) a developer material transport layer spincast over, and into said assembly recess of, each said cylindrical capping portion of said first and said second end cap sections, and (ii) a wear resistant layer spincast inside said developer material transport layer and against each said cylindrical capping portion of each said first and said second end cap sections.

3. The roller assembly of claim 2, wherein said assembly recess extends circumferentially relative to each said cylindrical capping portion.

4. The roller assembly of claim 2, wherein said developer material transport layer comprises a thermoset plastic material.

5. The roller assembly of claim 2, wherein said inner, wear resistant layer comprises fiber filled thermoset plastic material.

6. The roller assembly of claim 2, including a plural number of said assembly recess in each said first and said second end cap sections.

7. The roller assembly of claim 4, wherein said developer material transport layer comprises vinyl ester.

8. The roller assembly of claim 5, wherein said inner, wear resistant layer comprises a thermoset plastic material filled with glass beads.

9. The roller assembly of claim 6, including a pair of axially extending anti-rotation recesses formed into each said outer surface of each said first and said second end cap sections for receiving spincast first layer material.

10. A method of forming a roller assembly for use in a development apparatus of an electrostatographic reproduction machine, the method comprising the steps of:
    (a) staging in a spincasting mold assembly, preformed first and second end cap sections each having a stub shaft portion, and a cylindrical capping portion including an outer surface and a plurality of assembly recesses formed into said outer surface; and
    (b) spincasting in said spincasting mold assembly a first molten material (i) to form a first outer layer of a sleeve section connecting said first and second end cap sections, and (ii) to form locking means projecting into said assembly recesses for retaining and locking the sleeve section to said first and second end cap sections during rotation of the roller assembly.

11. The method of claim 10 including a step of spincasting within said first outer layer of the sleeve section, a second molding material to form a second layer therein for providing a wear resistant interior to the roller assembly.

12. The method of claim 11, wherein said first molding material has a specific gravity greater than that of said second molding material, and said first and second molding materials are spincast simultaneously.

13. A development apparatus for use in an electrostatographic reproduction machine to develop latent images with developer material, comprising:
    (a) a housing having walls defining a chamber storing the developer material;
    (b) means for mixing and moving developer material within said chamber;
    (c) a rotatable roller assembly for transporting developer material from said chamber to a development zone for transfer to a latent image, said rotatable roller assembly including;
       (i) a first and a second preformed end cap sections each having a stub shaft portion and a cylindrical capping portion connected to said stub shaft portion and having an outer surface and assembly recesses formed into said outer surface; and
       (ii) a sleeve section connecting said first and said second preformed end cap sections, said sleeve section being spincast as a layer over each said cylindrical capping portion, and into said assembly recesses of said first and said second end cap sections, to precisely and reliably assemble each said capping portion, to said sleeve section.

14. The development apparatus of claim 13, wherein said roller assembly includes magnetic members inserted within the core of said second layer of the sleeve section for forming a magnetic brush of developer material thereon.

15. The development apparatus of claim 13, including a developer material feeder roll for feeding developer material to said rotatable roller assembly, and electrical biasing means for biasing said feeder roll and said rotatable roller assembly so as to cause the transfer of only toner from said feeder roll onto said rotatable roller assembly.

16. The development apparatus of claim 13, wherein said sleeve section of said roller assembly includes a thin outermost portion of vinyl ester filled with carbon powder for making the roller assembly conductive.

* * * * *